Jan. 1, 1952     C. E. CUMMISKEY     2,580,410
ADAPTOR FOR STOKES LITTERS
Original Filed Jan. 8, 1946
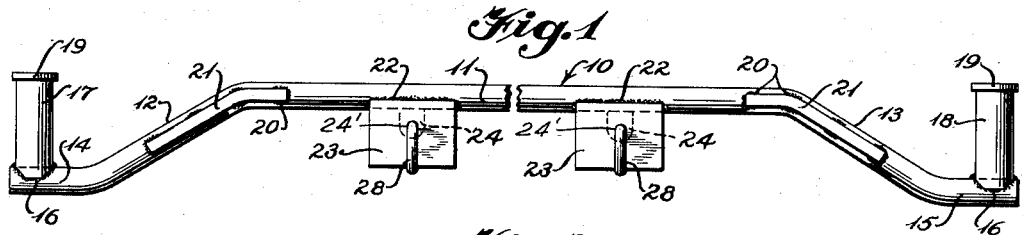
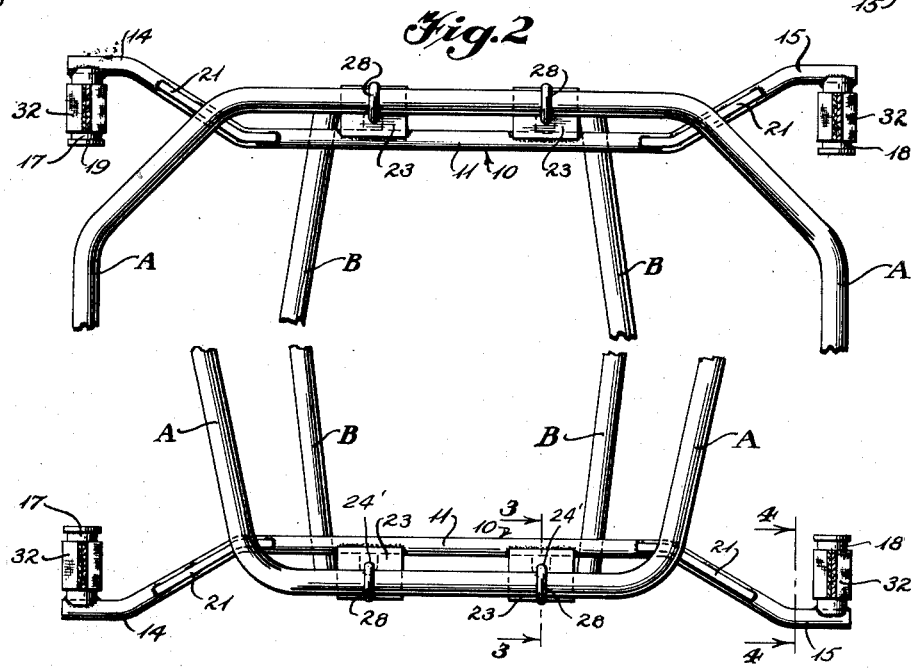
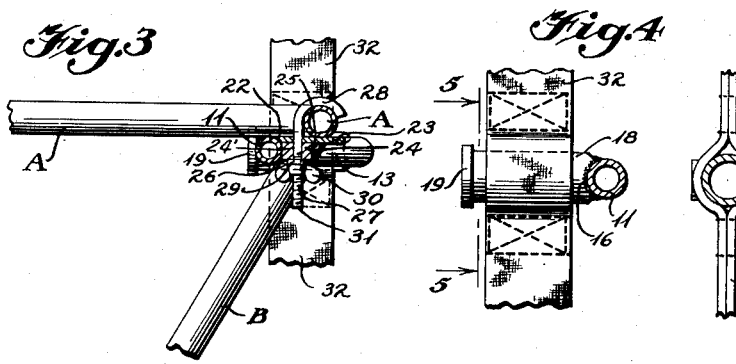
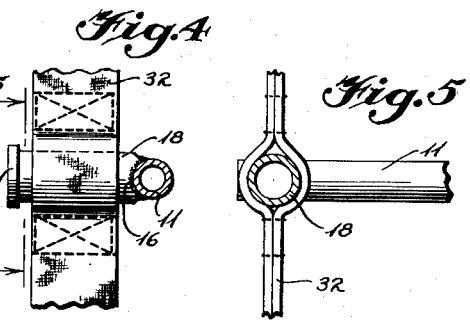
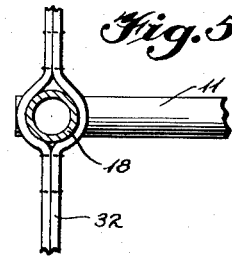
Inventor
Charles E. Cummiskey
By
Attorney Patented Jan. 1, 1952

2,580,410

UNITED STATES PATENT OFFICE 2,580,410

ADAPTER FOR STOKES LITTERS

Charles E. Cummiskey, Grosse Pointe, Mich.

Continuation of application Serial No. 639,884, January 8, 1946. This application November 7, 1949, Serial No. 126,004

3 Claims. (Cl. 5—82)

(Granted under the act of March 3, 1883, as amended April 30, 1928; 370 O. G. 757)

This invention relates to an adaptor for a Stokes litter shown basically in U. S. Patent No. 820,026 issued May 8, 1906 for use with web type of litter supports in ambulances, aircraft, ships, and the like.

This application is a continuation of my application Serial No. 639,884, filed January 8, 1944, now abandoned.

Stokes litters are shallow wire baskets shaped roughly in the form of a man and are generally useful to the armed forces so that an injured person may be strapped in the litter, the litter suspended in a sling, lowered through hatchways, and at times even turned upside down without further injury to the person.

In order that the Stokes litter be used with web type of litter supports in aircraft, ambulances and the like, some means of adapting the litter to the web type of support is necessary.

An object of this invention is to provide an adaptor for use with the Stokes litter which is of light weight, high strength and is easily installed on a litter.

Another object of this invention is to provide an adaptor that requires no special tools for installation.

A still further object of the invention is to provide an adaptor having means for spreading the load line contact.

A still further object of the invention is to provide a litter adaptor having means for easy engagement with supports in ambulances, aircraft, ships and the like.

Other objects and features of the invention will become apparent to those skilled in the art as the disclosure is made in the following detailed description of a preferred embodiment of the invention as illustrated in the accompanying sheet of drawing in which:

Fig. 1 is a plan view of the litter supporting adaptor.

Fig. 2 is a plan view of two of the litter supporting adaptors clamped on the ends of a Stokes litter.

Fig. 3 is a detail view partly in section of a portion of the adaptor taken on line 3—3 of Fig. 2.

Fig. 4 is a detail view in section of a portion of the adaptor taken on line 4—4 of Fig. 2.

Fig. 5 is a sectional view of a portion of the litter adaptor taken on line 5—5 of Fig. 4 with the web support shown.

Referring now to the drawings, wherein like reference characters designate like or corresponding parts throughout the several views, in Figs. 1 and 2, the litter adaptor 10 is composed of light weight steel tubing, or similar material, having a central portion 11 and portions 12 and 13 bent backwardly toward the ends 14 and 15 which are substantially parallel to the central portion 11. By means of weld 16, handles 17 and 18 are secured to ends 14 and 15 and each handle has a cap member 19 inserted in the end.

Along the top of the adaptor 10 over the bent portions 12 and 13 further welding 20 secures a reinforcing bar 21 to the adaptor 10. These are the portions of the adaptor which would normally come under the top periphery bar A at either the head end or foot end of the litter frame.

Also secured by welding 22 to the adaptor 10 are plates 23 having lugs 24 similarly secured by welding 25 and 26 to the plates and to the central portion 10 respectively, as shown in Fig. 3.

Plates 23 and lugs 24 have a bore 24' therethrough to receive the threaded end 27 of a J bolt 28. Washer 29 and wing nut 30 complete the assembly and form a means of securing the adaptor 10 to the Stokes litter frame member A. A burred end 31 on the threaded end 27 prevents accidental loss of the wing nut 30.

In use, the adaptor 10 is inserted from either side in the frame of the litter, under bars A and over bottom bars B, and clamped thereto by the J bolt 28, the reinforcing bars 21 providing strengthening means at the point of contact and also at the point of curvature or stress. Handles 17 and 18 provide easy means of carrying the litter by hand and may be conveniently slipped into the web type support 32 shown in Fig. 5, the cap members 19 serving as stops to prevent the handles from accidentally slipping out of the web supports. When not in use on a litter, the adaptors may be readily stacked and lashed together, and due to their light weight present no considerable penalty load.

It should be understood, of course, that the foregoing disclosure relates to only a preferred embodiment of the invention and that numerous modifications or alterations may be made therein without departing from the spirit and the scope of the invention as set forth in the appended claims.

The invention described herein may be manufactured and used by or for the Government of the United States of America for governmental purposes without the payment of any royalties thereon or therefor.

What is claimed is:

1. An adaptor for use with a basket type litter, comprising a tubular body having bent ends, handles at each end of said body engageable with web type litter supports, stop members on each handle for restraining movement out of said supports, clamp means on said body engageable with frame members of a litter, and reinforcing means at the bent portions of said body, said bent portions being in supporting contact with said frame members.

2. An adaptor for use with a basket type litter, comprising a body insertable laterally between and under frame members of a litter at one end thereof, a horizontal bend in each end of said body in the vicinity of its points of contact with the frame member, reinforcing strips secured to said body over said bent ends, clamping means on said body engageable with said frame member, and handle means fixed to each end of said body insertable in the openings of web type litter supports.

3. The device as set forth in claim 2 in which the handle means are in lateral alignment with said clamping means.

CHARLES E. CUMMISKEY.

REFERENCES CITED

The following references are of record in the file of this patent:

UNITED STATES PATENTS

| Number | Name | Date |
| --- | --- | --- |
| 1,082,177 | Skeffington | Dec. 23, 1913 |
| 1,944,909 | Thomas | Jan. 30, 1934 |